Figures 1, 2:
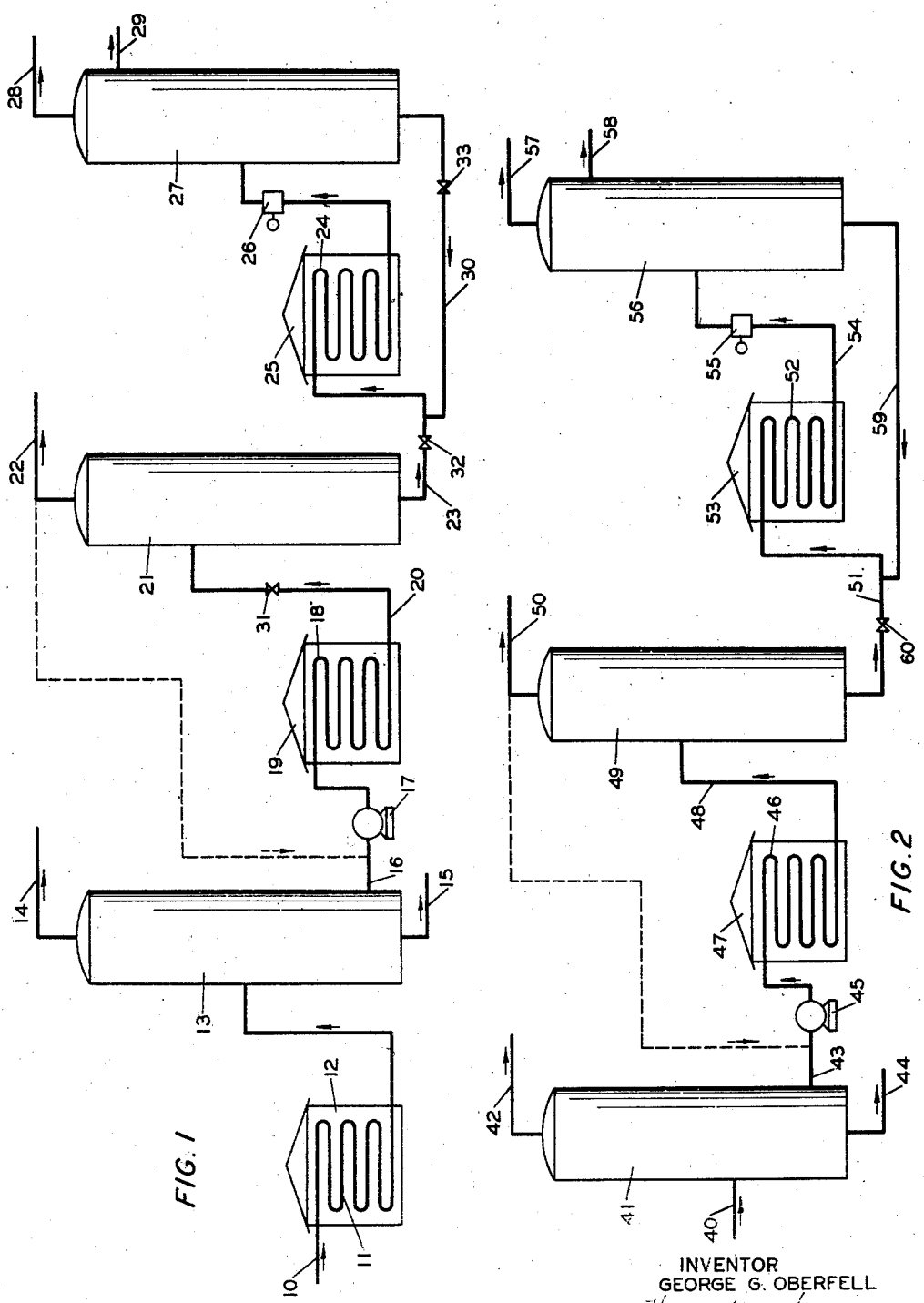

Aug. 8, 1944.  G. G. OBERFELL  2,355,392
PROCESS FOR TREATMENT OF HYDROCARBONS
Filed Aug. 12, 1940

INVENTOR
GEORGE G. OBERFELL
BY Hudson, Young, Shanley & Spingu
ATTORNEY

Patented Aug. 8, 1944

2,355,392

UNITED STATES PATENT OFFICE 2,355,392

PROCESS FOR TREATMENT OF HYDROCARBONS

George G. Oberfell, Bartlesville, Okla., assignor to Phillips Petroleum Company, a corporation of Delaware Application August 12, 1940, Serial No. 352,306

6 Claims. (Cl. 260—681.5)

This invention relates to a process for the separation and concentration of diolefinic hydrocarbons such as butadiene and the like from mixtures containing other hydrocarbons. More particularly it refers to the separation of diolefins by a process in which said diolefins are successively converted to polymers of relatively low molecular weight, separated in polymer form by distillation or other suitable methods, and finally recovered as monomeric diolefins by a depolymerization treatment.

An object of this invention is to separate diolefins from mixtures containing other hydrocarbons such as paraffins and monolefins.

Another object of this invention is to produce diolefins in concentrated form suitable for use in chemical conversion processes.

Another object of this invention is to free of diolefins hydrocarbon mixtures such as are produced by cracking operations.

The manufacture of butadiene, isoprene, and similar conjugated diolefins from petroleum hydrocarbons by cracking, dehydrogenation, and similar methods is handicapped by the fact that the desired diolefin generally is obtained in a very dilute form, in admixture with other hydrocarbons. For example, the four-carbon-atom fraction of gases from vapor phase oil cracking stills will usually contain less than 15 to 20 per cent of butadiene. Pyrolysis of butane gas under conventional conditions likewise gives very low percentages of butadiene. As a rule, a similar fraction from other cracking processes will contain much smaller percentages of butadiene.

In commercial processes utilizing diolefins it is very advantageous, if not economically imperative, to have said diolefins in concentrated form. For example, in the conversion of butadiene to synthetic rubber by copolymerization with unsaturated nitriles and other costly organic derivatives, it is generally uneconomical to start with a butadiene product of less than 90–95 per cent purity. For other processes and conditions, it may be economical to use lower concentrations of butadiene, but generally higher concentrations than can be produced directly are desired.

I have conceived the idea of producing a concentrate of diolefin from a hydrocarbon mixture containing said diolefin in a dilute form by polymerizing the diolefin under conditions favoring the formation of low polymers, preferably the dimer, then separating the polymers from the unpolymerized hydrocarbons by suitable means, such as fractional distillation, and then treating the low polymers under conditions which favor depolymerization to yield the original diolefins rather than cracking to form lower hydrocarbons, hydrogen, aromatics, etc.

Diolefins, such as butadiene and isoprene, undergo two distinct types of polymerization; one leads to the formation of dimers of a cyclic nature and the other to the formation of more or less rubbery polymers of high molecular weight and open branched or unbranched chain structure. The formation of the higher polymers is generally favored by low temperatures, such as 200–300° F. or lower, and by polymerization catalysts, such as oxygen, peroxides and other active oxygen containing compounds, alkali metals, acids, and metal halides. In general these are either catalysts or chemicals which react with the diolefin to form addition complexes.

I propose to carry out the polymerization of diolefins under conditions which favor the formation of dimers rather than the higher polymers. To accomplish this, I have found that I can operate in the temperature range 300–900° F. The rate of reaction of course increases with the temperature. Elevated pressures are generally advantageous and I have found that pressures within the range of atmospheric to around 500 pounds per square inch gauge are particularly effective. Higher pressures, however, may be employed where desirable, limited only by the degree of polymerization of the diolefin. Solid contact catalysts such as fuller's earth, bauxite, activated alumina, and silica gel favor the formation of the dimer in both liquid and vapor phase. It is also frequently advantageous to use inhibitors which repress the formation of the higher polymers, particularly in the lower part of the temperature range specified above.

While I may apply my invention directly to hydrocarbon fractions of comparatively wide boiling range, I prefer to separate fractions of rather narrow distillation range containing the desired diolefin and then subject the said fractions to the polymerization treatment. For example, I may separate a fraction boiling from 15° to 30° F. containing butadiene and a fraction boiling from 85° to 105° F. containing isoprene for treatment by my process.

Since the dimers which I form in my polymerization step boil at much higher temperatures than the original diolefins, the separation of polymer may be readily accomplished by ordinary distillation. For example, the dimer of butadiene boils above 320° F. while butadiene boils at about 23° F. However, I do not limit myself to that method of separation. The separation of the polymer may be accomplished for example by solvent extraction, fractional precipitation at low temperatures or other convenient methods. The depolymerization step is best carried out under conditions of relatively high temperature, low pressure, and relatively short heating times. Pressures of atmospheric down to a very few millimeters of mercury, absolute, are advantageous and I prefer the range 3 to 100 mm. Temperatures of 900° to 1300° F. are preferred, but considerably higher temperatures may be used providing the heating time is made sufficiently short to limit ordinary thermal decomposition. In general, shorter heating times are desirable at the higher temperatures. It is advantageous in many cases to limit the extent of conversion per pass in this manner and to separate and recycle the unconverted polymer in order to obtain higher yields of the monomeric diolefin.

As an alternative to the use of very low pressures I may dilute the polymers with an inert gas such as nitrogen, or with steam. The main object is to maintain a low partial pressure of dimer, and consequently of the monomeric diolefin, in the reactor.

The use of catalysts such as silver, copper, platinum, iron preferably in the form of the reduced oxides, and oxides of calcium and magnesium in the depolymerization step may also be advantageous. The optimum conditions of temperature and flow rate for any given catalyst may be determined by simple experiment.

The operation of the process is illustrated by the flow diagrams of Figures 1 and 2. In Figure 1 a raw petroleum or natural gas fraction such as a $C_2+C_3$ fraction enters through pipe 10 to cracking coil 11 heated by furnace 12 where it is cracked to a suitably limited degree. The products leaving the cracking coil are suitably cooled and then passed into fractionating system 13 which may consist of one or, preferably, two or three fractionating columns. A $C_4$ fraction is removed from fractionating system 13, through pipe 16 and circulated at high pressure by means of pump 17 through polymerization coil 18 heated by means of furnace 19. The partially polymerized product is removed through pipe 20 and expansion valve 31 to fractionating system 21 in which the normally liquid hydrocarbons containing diolefin dimers are separated and removed through line 23 and expansion valve 32 to a depolymerizing coil 24. The normally gaseous hydrocarbons are withdrawn from fractionating system 21 through pipe 22 and may be wholly or in part recycled to polymerization coil 18 or they may be completely discharged. The oily polymer is depolymerized in coil 24 heated by furnace 25 and maintained at a suitably low pressure by pump-compressor 26. The products are treated in the fractionating system 27 consisting of one or more columns. A $C_4$ fraction rich in butadiene is removed from pipe 29, a fraction comprising any lighter products formed by cracking is discharged through pipe 28 and a normally liquid residue is withdrawn through valve 33 and pipe 30 and recycled through the depolymerization coil.

In Figure 2, is shown a similar apparatus suitable to apply the process of this invention to the concentration of butadiene from such products as vapor phase cracking gases. These gases enter fractionating system 41 through pipe 40. A $C_4$ fraction is withdrawn through pipe 43 by means of pump 45 and passed through polymerization coil 46, heated by furnace 47. Lower and higher boiling fractions are withdrawn from the fractionating system 41, through pipes 42 and 44, respectively. Products from the polymerization coil 46 after suitable cooling are fractionated in fractionator 49 and a normally liquid polymer is withdrawn through expansion valve 60 and pipe 51 to depolymerization coil 52 heated in furnace 53. Unpolymerized light hydrocarbons are withdrawn from fractionator 49 by means of pipe 50 and may be either discharged, or fractionated and partially recycled to the polymerization coil 46. The products from the depolymerization coil 52 are pumped through pipe 54 by means of pump compressor 55 to fractionating system 56, from which a $C_4$ fraction rich in butadiene is removed through pipe 58. A more volatile fraction which may be produced by partial cracking is withdrawn from pipe 57. A normally liquid fraction is withdrawn through pipe 59 and may be recycled as a whole or fractionated to eliminate very heavy materials and the lighter fraction recycled.

The flow diagrams show only the essential apparatus. In actual operation many modifications may be advantageous. For example, heat exchange between the products and the raw feed of each of the furnaces may be applied. Greater flexibility in operation and control may be effected by inserting accumulators between stages of the process. Some of the fractionating system shown as single columns would actually comprise two or possibly three columns with the usual auxiliary and control equipment. Suitable catalysts may be used in polymerization coils 18 and 46 and depolymerization coils 24 and 52. Other suitable equipment and modifications will be obvious to those skilled in the art.

Although the flow diagrams indicate continuous processes, my invention may obviously be applied as a batch process as well. The following examples include two methods of practicing my invention.

*Example 1.*—An ethane-propane mixture is cracked at one atmosphere pressure and 1450° F. temperature deeply enough to form 5 per cent of $C_4$ and heavier hydrocarbons. A $C_4$ fraction is separated having the following composition.

| | Per cent |
|---|---|
| Butanes, $C_4H_{10}$ | 10 |
| Butadiene, $C_4H_6$ | 50 |
| Isobutylene, $C_4H_8$ | 30 |
| Normal butenes, $C_4H_8$ | 10 |
| | 100 |

This $C_4$ fraction is digested at 390° F. and 500 pounds per square inch gauge pressure long enough to convert 50 per cent of the total into normally liquid hydrocarbons. The latter are separated by fractional distillation and are then depolymerized by passing through an empty tube at 1 atmosphere pressure and 1022° F. at such a rate that 20 per cent per pass is converted into gaseous products. The said gaseous products are separated and a $C_4$ fraction is cut therefrom which is found to be concentrated butadiene. Liquids boiling at 20 to 450° F. are recycled to the depolymerization furnace.

*Example 2.*—A $C_4$ fraction of the vapors produced in a vapor phase oil cracking process are digested at 390° F. and 500 pounds per square inch gauge pressure sufficiently to convert 15 to 20 per cent of the total into normally liquid hydrocarbons. These polymeric liquid hydrocarbons are separated by fractionation and are then passed at atmospheric pressure through a tube filled with bauxite at 930° F. at such a rate that 20 per cent per pass is converted into gaseous products. The said gaseous products are separated and a C₄ fraction rich in butadiene is cut therefrom while the normally liquid hydrocarbons are recycled to the cracking furnace.

While the foregoing examples serve to illustrate two possible adaptations of my process they are not to be construed as limitations thereupon, since many other modifications within the scope of my invention will be obvious to those skilled in the art.

I claim:

1. The process for the separation of a low-boiling open chain diolefin from a mixture of hydrocarbons having boiling points substantially the same as the boiling points of said diolefin which comprises subjecting the hydrocarbon mixture in a polymerization step to conditions of elevated temperature and superatmospheric pressure which promote dimerization of said diolefin to the dimer thereof as the principal reaction occurring, separating the resulting dimer from the effluent of the polymerization step, and subjecting the dimer in a depolymerization step to conditions of elevated temperatures and in the presence of sufficient steam to maintain low partial pressure of said dimer effecting conversion of said dimer to the monomeric low-boiling open chain diolefin.

2. The process of claim 1 in which butadiene is the low-boiling open chain diolefin.

3. The process for the separation of a low-boiling open chain diolefin from a mixture of hydrocarbons having boiling points within about 15° F. of the boiling point of the diolefin which comprises polymerizing the diolefin in the presence of said hydrocarbons in a polymerization step under conditions of elevated temperature and superatmospheric pressure which promote as the principal reaction dimerization of the diolefin to the dimer thereof having a boiling point appreciably greater than that of the diolefin, fractionating the effluent of the polymerization step to separate the dimer therefrom, depolymerizing at least a part of the dimer in the effluent of the polymerization step in a depolymerization step to conditions of elevated temperature and in the presence of sufficient steam to maintain low partial pressure of the dimer which promote depolymerization of the dimer to the monomeric diolefin, fractionating the effluent of the depolymerization step to separate the diolefin from the dimer, and recycling the dimer to the depolymerization step.

4. The process for the separation of butadiene from a mixture of C₄ hydrocarbons which comprises subjecting the mixture in a polymerization step to conditions of elevated temperature within the range of 300° F. to 900° F. and superatmospheric pressure within the range of atmospheric pressure to about 500 pounds per square inch which result in dimerization of butadiene in the presence of other C₄ hydrocarbons to the dimer thereof as the principal reaction occurring, separating the dimer from the effluent of the polymerization step, subjecting the dimer in a depolymerization step to conditions of elevated temperatures in the range of 900° F. to 1300° F. and in the presence of sufficient steam to maintain low partial pressure of the dimer which result in depolymerization of dimer to monomeric butadiene, fractionating the effluent of the depolymerization step in a fractionation step to form a fraction containing the monomeric butadiene and a fraction containing the dimer effluent of the depolymerization step, and recycling the dimer from the fractionation step to the depolymerization step.

5. The process which comprises subjecting the dimer of butadiene to a temperature within the range of about 900° F. to about 1300° F. in admixture with sufficient steam to maintain the partial pressure of said dimer within the range of 3 to 100 mm. effecting depolymerization of said dimer as the principal reaction of the process.

6. The process which comprises subjecting the dimer of butadiene to a temperature within the range of about 900° F. to about 1300° F. in admixture with sufficient steam to maintain the partial pressure of said dimer within the range of 3 to 100 mm. and in the presence of a magnesium oxide depolymerization catalyst effecting depolymerization of said dimer as the principal reaction of the process.

GEORGE G. OBERFELL.